United States Patent
Farrell et al.

(10) Patent No.: US 8,564,828 B2
(45) Date of Patent: Oct. 22, 2013

(54) AUTOMATED METHODS AND SYSTEMS FOR ASSESSING AND SUMMARIZING GAMUT REQUIREMENTS

(75) Inventors: Michael E. Farrell, Webster, NY (US); Nicholas Paul Osadciw, Webster, NY (US); Javier A. Morales, Irondequoit, NY (US); David E. Rumph, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 307 days.

(21) Appl. No.: 11/937,985

(22) Filed: Nov. 9, 2007

(65) Prior Publication Data

US 2009/0122325 A1    May 14, 2009

(51) Int. Cl.
   *G06F 15/00* (2006.01)

(52) U.S. Cl.
   USPC ........... 358/1.9; 358/518; 358/520; 358/1.13; 382/162; 382/163; 345/590; 345/591; 345/593

(58) Field of Classification Search
   USPC .......... 358/1.9, 518, 520, 1.13; 382/162, 163; 345/590, 591, 593
   See application file for complete search history.

(56) References Cited

U.S. PATENT DOCUMENTS

| | | | |
|---|---|---|---|
| 5,313,570 A | 5/1994 | Dermer et al. | |
| 6,104,829 A | 8/2000 | Nakajima | |
| 6,381,036 B1 | 4/2002 | Olson | |
| 6,407,820 B1 | 6/2002 | Hansen et al. | |
| 6,549,654 B1 | 4/2003 | Kumada | |
| 6,704,442 B2 | 3/2004 | Haikin et al. | |
| 6,947,589 B2 | 9/2005 | Newman et al. | |
| 7,061,503 B2 | 6/2006 | Newman | |
| 7,173,736 B2 | 2/2007 | Yamada | |
| 7,233,694 B2 | 6/2007 | Fukui | |
| 7,251,358 B2 | 7/2007 | Haikin | |
| 7,266,238 B2 | 9/2007 | Haikin | |
| 7,355,745 B2 * | 4/2008 | Hudson et al. | 358/1.9 |
| 7,433,102 B2 | 10/2008 | Takahashi et al. | |
| 2001/0043357 A1 * | 11/2001 | Owa et al. | 358/1.15 |
| 2003/0002061 A1 | 1/2003 | Van de Capelle | |
| 2005/0094169 A1 | 5/2005 | Berns et al. | |
| 2006/0044346 A1 | 3/2006 | Hakamada | |
| 2006/0066650 A1 * | 3/2006 | Huang et al. | 347/7 |
| 2006/0072133 A1 | 4/2006 | Han et al. | |
| 2006/0098233 A1 * | 5/2006 | Jodra et al. | 358/3.26 |
| 2006/0114481 A1 | 6/2006 | Moore | |
| 2006/0126119 A1 | 6/2006 | Morales et al. | |
| 2006/0227354 A1 | 10/2006 | Farrell et al. | |
| 2006/0262339 A1 | 11/2006 | Jacobs et al. | |
| 2007/0002342 A1 | 1/2007 | Morales et al. | |
| 2007/0201077 A1 | 8/2007 | Morales et al. | |
| 2007/0201078 A1 | 8/2007 | Morales et al. | |
| 2008/0127846 A1 | 6/2008 | Nagai | |
| 2008/0130022 A1 | 6/2008 | Dalal et al. | |
| 2008/0204772 A1 | 8/2008 | Kauffman | |
| 2008/0246982 A1 | 10/2008 | Kaneko et al. | |
| 2008/0259363 A1 | 10/2008 | Walton et al. | |

\* cited by examiner

*Primary Examiner* — Benny Q Tieu
*Assistant Examiner* — Paul F Payer
(74) *Attorney, Agent, or Firm* — Fox Rothschild LLP

(57) ABSTRACT

Methods and systems of assessing color gamut requirements for a print job and a printing device are disclosed. A print job including one or more input color spaces may be received. A computing device may produce a color transformation for each input color space using at least a color gamut error profile. The computing device may further produce result information based on the one or more color transformations. Result information may be provided to a user.

17 Claims, 3 Drawing Sheets

AUTOMATED METHODS AND SYSTEMS FOR ASSESSING AND SUMMARIZING GAMUT REQUIREMENTS

BACKGROUND

The present disclosure generally relates to print systems and methods for operating such systems. More specifically, the present disclosure relates to methods and systems for assessing color gamut requirements for the combination of a print job and a printing device.

Conventionally, print operations printing a full range of colors have been performed using a four-color printing technology that uses three primary ink colors—cyan, magenta, and yellow—plus black (abbreviated as CMYK). More recently, five or more color ("high fidelity") printing technologies have been introduced to provide a larger and more vibrant color gamut. An exemplary high fidelity printing technology is Pantone's Hexachrome system, which adds orange and green to the traditional CMYK.

Color printing can also use "spot color" inks alone or in combination with one of the above described printing methods. Spot color inks are specific color formulations that are printed alone, rather than mixed to produce various hues and shades. The range of available spot color inks is nearly unlimited. Spot color inks can be used to print colors from subtle pastels to fluorescent greens and oranges to metallic silvers, golds and other finishes.

As digital color printing increasingly becomes a commodity, print shop operators and other print providers have sought to determine ways to grow revenue and reduce costs. One way to increase revenue is to perform print jobs having high fidelity color requirements. A print provider can usually charge a customer more for a high fidelity color print job because of the superior color rendition.

In order to reduce costs, print providers desire to minimize the use of high fidelity color printing devices, particularly 6+ color printing devices, whenever possible because of the increased operating costs over other printing devices. However, it is difficult to determine whether an incoming high fidelity print job will actually benefit from being printed on a 6 color printing device. In some cases, a high fidelity print job printed on a 6 color printing device will not look significantly better than the same print job printed on a 4 color or 5 color printing device. As such, potential profit is lost when the high fidelity print job is automatically processed using a 6 color printing device.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "print job" is a reference to one or more print jobs and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a method of assessing color gamut requirements for a print job and a printing device may include receiving a print job, producing a color transformation for the print job using at least a color gamut error profile, producing result information based on the color transformation, and providing the result information to a user.

In an embodiment, a system for assessing color gamut requirements for a print job and a printing device may include a processor, and a processor readable storage medium in communication with the processor. The processor readable storage medium contains one or more programming instructions for performing a method of assessing color gamut requirements for a print job and a printing device. The method may include receiving a print job, producing a color transformation for the print job using at least a color gamut error profile, producing result information based on the color transformation, and providing the result information to a user.

In an embodiment, a method of assessing color gamut requirements for a print job and a printing device may include receiving a print job comprising one or more input color spaces and one or more colors, producing, by a computing device, a color transformation for each input color space using at least a color gamut error profile, determining, by the computing device, one or more colors of the print job that are out-of-gamut, for at least one color that is out-of-gamut, determining, by the computing device, an amount by which the color of the print job is out-of-gamut, and providing result information pertaining to the amount by which the at least one color is out-of-gamut.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
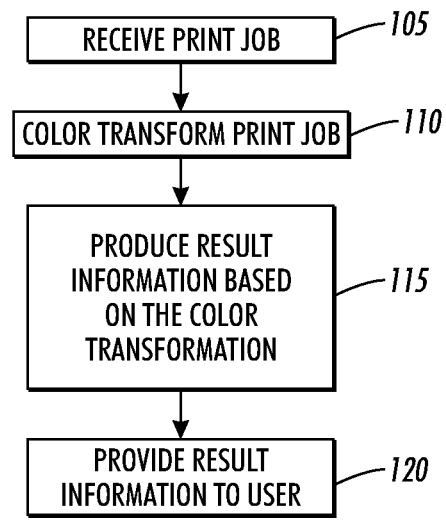
FIG. 1 depicts a flow diagram of an exemplary method of assessing color gamut requirements for a print job and a printing device according to an embodiment.

The following terms shall have, for the purposes of this application, the respective meanings set forth below.

A "job" refers to a logical unit of work that is to be completed for a customer. A job may include one or more print jobs from one or more customers. A production system may include a plurality of jobs. Although the disclosed embodiments pertain to a print shop and printing devices, the disclosed methods and systems can be applied to production systems in general.

A "print job" refers to a job processed in a print shop or other document production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "printing device" refers to an electronic device that is capable of receiving commands, printing text, vector graphics and/or images on a substrate and/or scanning a document. Print devices may include, but are not limited to, network printers, production printers, copiers, facsimile machines and/or other devices using ink or toner.

A "printing technology" refers to a set of inks or toners available to a printing device for printing a print job. Exemplary printing technologies include CMYK, Red-Green-Blue (RGB), Cyan-Magenta-Yellow-Black-Orange (CMYKO), Cyan-Magenta-Yellow-Black-Orange-Green (CMYKOG), Cyan-Light Cyan-Magenta-Light Magenta-Yellow-Black (CcMmYK), Cyan-Light Cyan-Magenta-Pink-Yellow-Black (CcMPYK), Cyan-Magenta-Yellow-Black-Orange-Violet (CMYKOV), Cyan-Magenta-Yellow-Black-Orange-Blue (CMYKOB), CMYK/RGB and the like. A "high fidelity printing technology" refers to a printing technology having a set of inks or toners having more than 4 colors, such as CMYKO.

A "gamut" or "color gamut" refers to a complete subset of colors that can be produced by a printing device or via a display device. A gamut or color gamut can alternately refer to a complete subset of colors that are present in a print job or a portion of a print job, such as a section, a page, an object or the like.

A "color profile" refers to a relationship between a color space and a well known standard. A color profile may be used to transform a color space for a print job, printing device (based on a particular printing technology) or display device into, for example, a standardized color space, or vice versa. A color profile may include a "source color profile" (which translates a color space to a standardized color space), a "destination color profile" (which translates the standardized color space to the color space) or both. In an embodiment, the standardized color space may be the color space defined by the International Color Consortium (ICC).

A "color gamut error profile" refers to a destination color profile that identifies a vector and/or a scalar value for each color in a color space corresponding to an amount by which the color is out-of-gamut for a corresponding printing device, display device or printing technology.

"Out-of-gamut" refers to a condition in which a color in a print job cannot be accurately represented using a printing device or a printing technology; that is, the color falls outside the subset of colors that the printing device or the printing technology can produce.

"Color transformation" refers to the process of translating a print job (or a portion thereof) that is represented in an input color space to an output. In conventional systems, a color transformation converts each input color space for a print job, on a color by color basis, into an output color space using mathematical algorithms represented by two color profiles: the first color profile converts an input color space to a standardized color space, and the second color profile converts the standardized color space to an output color space. In embodiments described further in this disclosure, the second color profile may be replaced with a color gamut error profile which converts the standardized color space to a scalar value or a vector representing an amount by which a color is out-of-gamut. The mathematical algorithms of the color profiles for a color transformation may be convolved to produce a single mathematical algorithm to increase efficiency.

"Color drift" refers to a color difference between a representation of a print Job and a processed representation of the print job. Color drift may occur as a result of a color transformation process for a print job.

"Rasterization" refers to the task of taking a set of objects, such as those representing a page described in an input format, and converting the set of objects into a raster image (pixels or dots) for output on a printing device or a video display. For example, rasterization may encompass the process for converting an object in a vector graphics format into a raster image, the process of converting an entire input page into a raster image or the like.

The present disclosure pertains to methods and systems for assessing the extent and frequency with which out-of-gamut conditions are present in a print job using a printing technology. The print job may be transformed by using a source color profile and a destination color gamut error profile, and result information produced from the evaluation may be presented, for example, for objects having out-of-gamut conditions. In an embodiment, objects having spatially varying color values may be rasterized prior to providing result information. In an alternate embodiment, all objects may be rasterized prior to providing result information.

The result information may be summarized and presented to a user. The user may determine the impact of the out-of-gamut conditions on the visual effect of the print job. In an alternate embodiment, the result information may be presented to an automated system that may determine the impact of the out-of-gamut conditions. The result information may include separate information pertaining to a plurality of color spaces, such as spot colors, RGB, text and the like. The resulting information may include maximum out-of-gamut values, typical out-of-gamut values and/or percentile values, such as 95 percentile values.

FIG. 1 depicts a flow diagram of an exemplary method of assessing color gamut requirements for a print job and a printing device according to an embodiment. As shown in FIG. 1, a print job may be received 105. For example, the print job may be received 105 at a print shop or other print provider. The print job may include one or more objects. Each object may have an object type, such as, for example, an image, text, a vector graphic or the like. The print job may include one or more input color spaces.

A computing device may color transform 110 the print job. In an embodiment, the print job may be color transformed 110 by using a source color profile for at least one input color space in the print job and a color gamut error profile. An input color space may include, for example, an RGB color space, spot colors, grayscale, a CMYK color space or the like. A resulting color space may include, for example, a CMYK color space, a CMYKOG color space, a CcMmYK color space, a CcMPYK color space, a CMYKOV color space, a CMYKOB color space or any other color space and/or spot colors. In an embodiment, the mathematical algorithms used by the source color profile and the color gamut error profile may be convolved into a single mathematical algorithm to improve processing efficiency. In an embodiment, at least one object may be rasterized when the print job is color transformed 110.

A computing device may produce 115 result information as a result of the color transformation. In an embodiment, the result information may include a scalar value that is proportional to the amount by which a color is out-of-gamut. In an embodiment, the scalar value for a particular color may be set to 0 if the color is in gamut and to a value greater than 0 if the color is out-of-gamut. As such, a color gamut may be inferred from the color gamut error profile because the color gamut may include all values for which the scalar value is 0. If the scalar value for a color is non-zero, the scalar value may be proportional to the amount by which the color is out-of-gamut. In an embodiment, the scalar value may represent a distance measure based on a vector between, for example, a gamut boundary and the color. In an embodiment, the scalar values may be aggregated to provide information about, for example, an object and/or the print job as a whole.

Result information may be produced 115 for at least one input color space. In an embodiment, result information produced 115 for a portion of the objects in the print job, such as a single object or objects of a particular type, may be produced based on a color gamut error profile corresponding to a printing technology or a printing device. In an embodiment, an amount by which an object of a first type is out-of-gamut may be weighted more heavily than an amount by which an object of a second type is out-of-gamut when providing result information as to whether a particular printing device is acceptable for a print job.

Figure 2A:
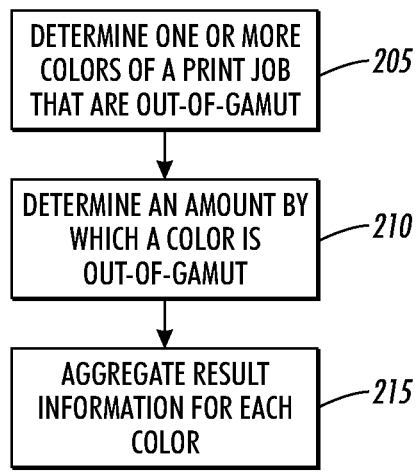
FIGS. 2A-C depict flow diagrams of exemplary operations for producing result information according to embodiments.

In an embodiment depicted in FIG. 2A, producing 115 result information may include determining 205 one or more colors of the print job that are out-of-gamut for a particular printing technology and, for at least one of those colors, determining 210 an amount by which the color is out-of-gamut. The result information for each color may be aggregated 215 and provided 120 in a consolidated format to a user. For example, the result information may include a designation that 3% of the page area for a print job is out-of-gamut for the printing technology corresponding to the color gamut error profile, but is less than 3 $\Delta E$ out-of-gamut, and 1% of the page area for the print job is between 3 $\Delta E$ and 5 $\Delta E$ out-of-gamut. $\Delta E$ is a known color difference measure. Additional or alternate difference measures may also be used within the scope of this disclosure.

Figure 2B:
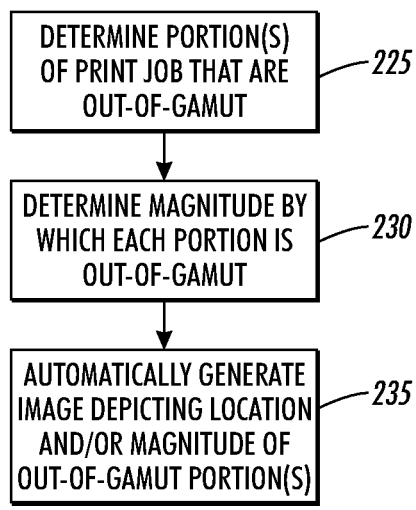

In an embodiment depicted in FIG. 2B, producing 115 result information may include determining 225 one or more spatial positions of portions of a print Job that are out-of-gamut of a particular printing technology. In an embodiment, the magnitude by which each portion of the print job is out-of-gamut may also be determined 230. An image may be automatically generated 235 that depicts the spatial position of the portions of the print job that are out-of-gamut and optionally the magnitude by which each portion is out-of-gamut. For example, the image may include a user-defined color to denote portions of the image that are out-of-gamut of the printing technology. The magnitude by which the portion of the print job is out-of-gamut may be represented as a change in color density for the user-defined color. Other methods of representing an out-of-gamut condition and/or the amount by which a pixel is out-of-gamut may also be performed within the scope of this disclosure.

Figure 2C:
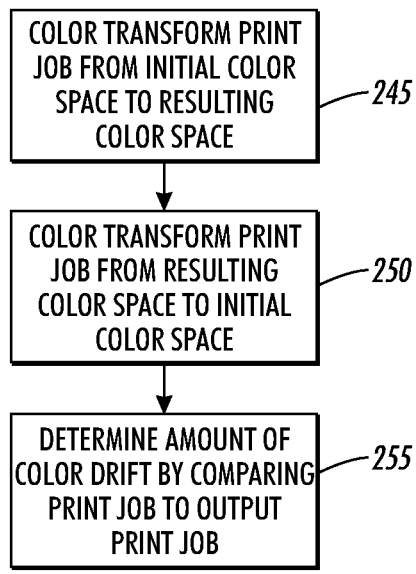

In an embodiment depicted in FIG. 2C, producing 115 result information may include assessing color deviations associated with gamut mapping behavior by determining color differences for in-gamut colors. In an embodiment, an in-gamut color difference may be calculated by color transforming 245 the print job from an initial color space to a resulting color space using a color characterization profile, such as an ICC profile, to produce a color transformed print job, color transforming 250 the color transformed print job from the resulting color space back to the input color space using an inverse color characterization profile to produce an output print job, and determining 255 an amount of color drift by comparing the print job to the output print job. The amount of color drift may be determined 255 by determining one or more portions of the output print job that differ from the print job, and, for at least one of the portions, determining an amount by which the portion of the output print job differs from the print job. In an embodiment, the amount for each portion for which a color difference is determined may be represented by a scalar value.

Referring back to FIG. 1, the result information may be provided 120 to a user. In an embodiment, the result information may be provided 120 via one or more of a computer display, a physical medium, an electronic device, or the like. In an embodiment, the result information may additionally or alternately be provided 120 to an automated system.

Figure 3:
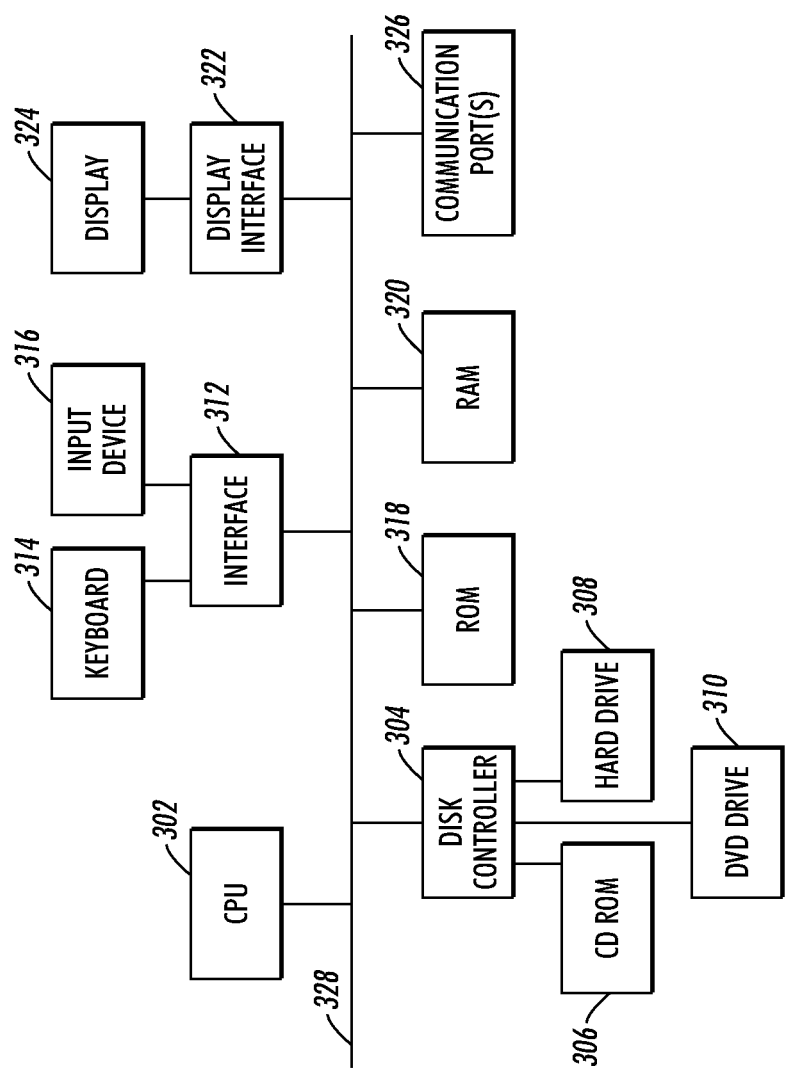
FIG. 3 depicts a block diagram of an exemplary system that may be used to contain or implement program instructions for assessing color gamut requirements for a print job and a printing device according to an embodiment.

FIG. 3 depicts a block diagram of an exemplary system that may be used to contain or implement program instructions for assessing color gamut requirements for a print job and a printing device according to an embodiment. Referring to FIG. 3, a bus 328 serves as the main information highway interconnecting the other illustrated components of the hardware. CPU 302 is the central processing unit of the system, performing calculations and logic operations required to execute a program. Read only memory (ROM) 318 and random access memory (RAM) 320 constitute exemplary memory devices or storage media.

A disk controller 304 interfaces with one or more optional disk drives to the system bus 328. These disk drives may include, for example, external or internal DVD drives 310, CD ROM drives 306 or hard drives 308. As indicated previously, these various disk drives and disk controllers are optional devices.

Program instructions may be stored in the ROM 318 and/or the RAM 320. Optionally, program instructions may be stored on a computer readable storage medium, such as a hard drive, a compact disk, a digital disk, a memory or any other tangible recording medium.

An optional display interface 322 may permit information from the bus 328 to be displayed on the display 324 in audio, graphic or alphanumeric format. Communication with external devices may occur using various communication ports 326.

In addition to the standard computer-type components, the hardware may also include an interface 312 which allows for receipt of data from input devices such as a keyboard 314 or other input device 316 such as a mouse, remote control, pointer and/or joystick.

An embedded system may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of assessing color gamut requirements for a print job and a printing device, the method comprising:
   receiving a print job;
   producing, by a computing device, a color transformation for the print job using at least a color gamut error profile;
   producing, by the computing device, result information based on the color transformation by:
   determining an in-gamut color difference by color transforming the print job from an initial color space to a resulting color space using a color characterization profile to produce a color transformed print job, color transforming the color transformed print job from the resulting color space back to the initial color space using an inverse color characterization profile to produce an output print job, and determining an amount of color drift by comparing the print job to the output print job; and providing the result information to a user.

2. The method of claim 1 wherein receiving a print job comprises:

receiving a print job comprising one or more objects, wherein the one or more objects comprise at least one of the following: an image, text, and a vector graphic.

3. The method of claim 1 wherein receiving a print job comprises receiving a print job comprising one or more input color spaces, wherein producing a color transformation comprises producing, by the computing device, a color transformation for each input color space using at least a color gamut error profile, and wherein producing result information comprises producing, by the computing device, result information based on the one or more color transformations.

4. The method of claim 1 wherein receiving a print job comprises receiving a print job comprising one or more objects, and wherein producing a color transformation comprises:

color transforming the one or more objects from an input color space into one or more resulting color spaces; and rasterizing at least one color-transformed object.

5. The method of claim 1 wherein producing a color transformation comprises:

producing, by the computing device, a color transformation using a color profile and a color gamut error profile.

6. The method of claim 1 wherein producing result information further comprises:

automatically generating an image depicting a spatial position of a portion of the print job that is out-of-gamut based on the color gamut error profile.

7. The method of claim 1 wherein producing result information further comprises:

automatically generating an image depicting a spatial position of a portion of the print job that is out-of-gamut based on the color gamut error profile and a magnitude by which the portion of the print job is out-of-gamut.

8. The method of claim 1, wherein determining an amount of color drift comprises:

determining one or more portions of the output print job that differ from the print job; and for at least one of the portions, determining an amount by which the portion differs from the print job.

9. The method of claim 8, wherein the amount by which the portion differs from the print job is represented by a scalar value.

10. A system for assessing color gamut requirements for a print job and a printing device, the system comprising:

a processor; and a processor readable storage medium in communication with the processor, wherein the processor readable storage medium contains one or more programming instructions for performing a method of assessing color gamut requirements for a print job and a printing device, the method comprising:

receiving a print job, producing a color transformation for the print job using at least a color gamut error profile, producing result information based on the color transformation by:

determining an in-gamut color difference by color transforming the print job from an initial color space to a resulting color space using a color characterization profile to produce a color transformed print job, color transforming the color transformed print job from the resulting color space back to the initial color space using an inverse color characterization profile to produce an output print job, and determining an amount of color drift by comparing the print job to the output print job, and providing the result information to a user.

11. The system of claim 10 wherein the one or more programming instructions for receiving a print job comprise one or more programming instructions for receiving a print job comprising one or more input color spaces, wherein the one or more programming instructions for producing a color transformation comprise one or more programming instructions for producing a color transformation for each input color space using at least a color gamut error profile, and wherein the one or more programming instructions for producing result information comprise one or more programming instructions for producing result information based on the one or more color transformations.

12. The system of claim 11, wherein the one or more programming instructions for determining an amount of color drift comprise one or more programming instructions for:

determining one or more portions of the output print job that differ from the print job; and for at least one of the portions, determining an amount by which the portion differs from the print job.

13. The system of claim 12, wherein the amount by which the portion differs from the print job is represented by a scalar value.

14. The system of claim 10 wherein the one or more programming instructions for receiving a print job comprise one or more programming instructions for receiving a print job comprising one or more objects, and wherein the one or more programming instructions for producing a color transformation comprise one or more programming instructions for:

color transforming the one or more objects from an input color space into one or more resulting color spaces; and rasterizing at least one color-transformed object.

15. The system of claim 10 wherein the one or more programming instructions for producing a color transformation comprise one or more programming instructions for:

producing a color transformation using a color profile and a color gamut error profile.

16. The system of claim 10 wherein the one or more programming instructions for producing result information comprise one or more programming instructions for:

identifying out-of-gamut statistics based on the color transformation.

17. The system of claim 10 wherein the one or more programming instructions for producing result information comprise one or more programming instructions for:

determining one or more colors of the print job that are out-of-gamut based on the color gamut error profile; and for at least one color, determining an amount by which the color of the print job is out-of-gamut.

* * * * *